Aug. 12, 1947.                L. E. NORTON                2,425,385
                            DIRECTION FINDER
                          Filed May 29, 1943            2 Sheets—Sheet 1
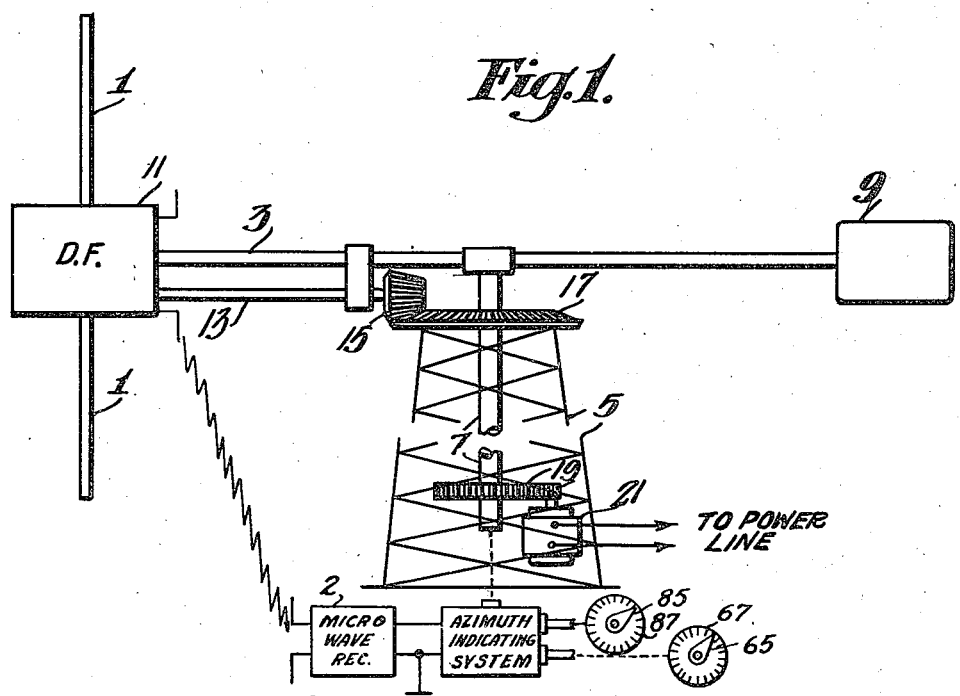
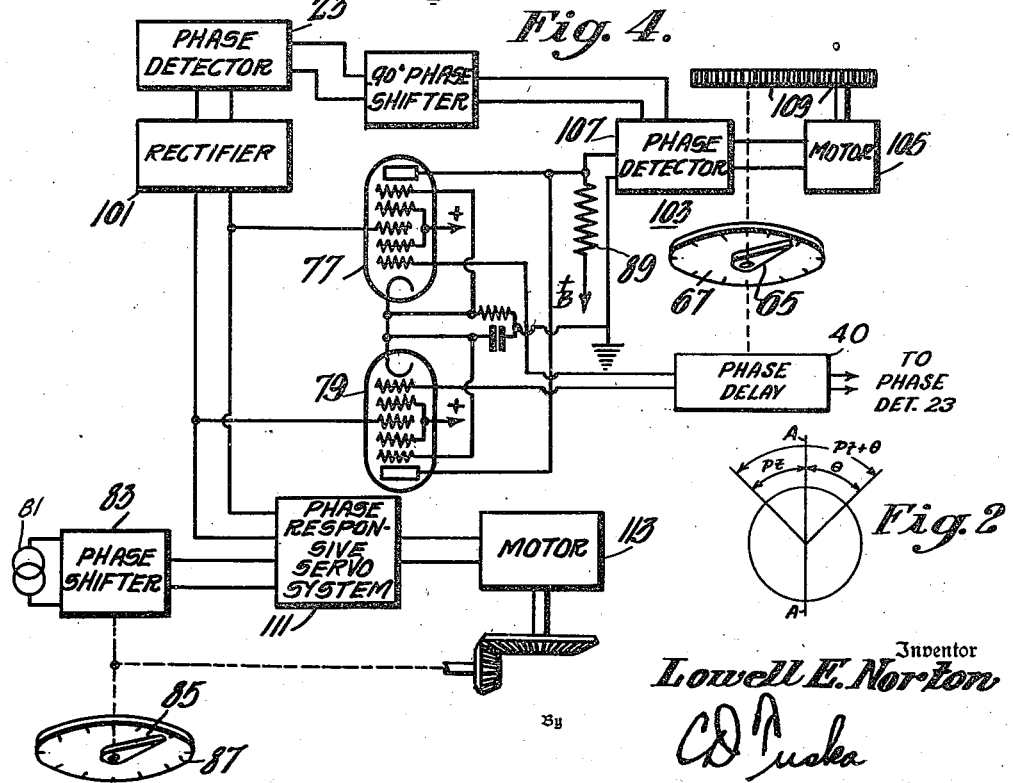
Inventor
Lowell E. Norton
By
C D Tuska
Attorney

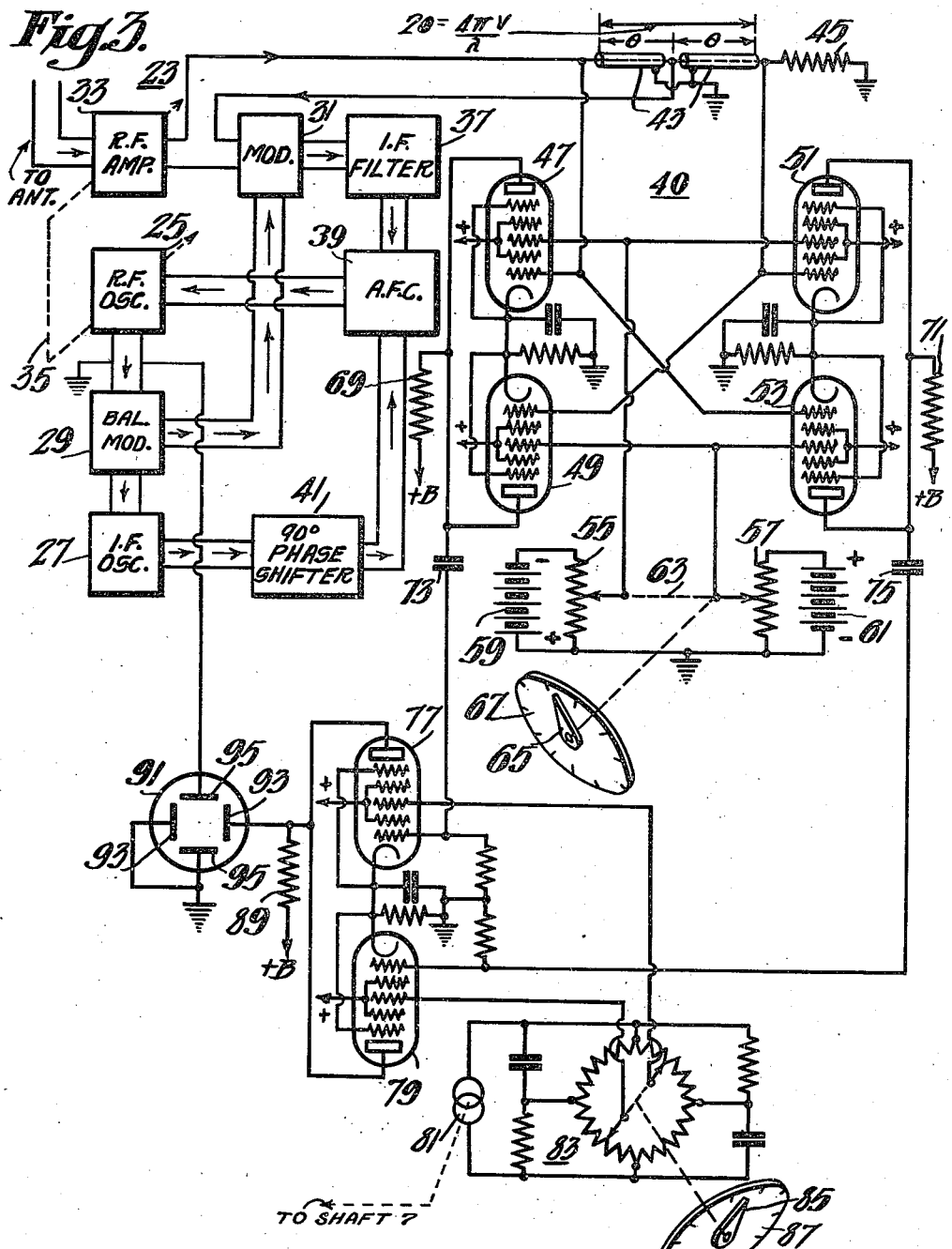

Patented Aug. 12, 1947

2,425,385

UNITED STATES PATENT OFFICE 2,425,385

DIRECTION FINDER

Lowell E. Norton, Princeton, N. J., assignor to Radio Corporation of America, a corporation of Delaware Application May 29, 1943, Serial No. 489,033

4 Claims. (Cl. 250—11)

This invention relates to radio direction finders, and more particularly to improvements in the art of determining the azimuth of arrival of a radio wave by means of a continuously revolving collector system, as described in detail in copending U. S. application Ser. No. 487,678, filed on May 20, 1943, by L. E. Norton, entitled Direction finders. Revolution of the collector system provides phase modulation of the carrier of a received signal. The absolute phase of this modulation is a function of the azimuth of wave arrival. One method of determining azimuth in response to the modulation introduced by antenna revolution is described in the above mentioned application.

The principal object of the present invention is to provide an improved method of and means for indicating azimuth of wave arrival in response to phase modulation established at the receiving antenna.

Another object is to provide an improved method of and means for indicating the elevation of wave arrival in response to phase modulation established at the receiving antenna.

A further object is to provide a fully automatic direction indicating system of the described type.

These and other objects will become apparent to those skilled in the art upon consideration of the following description with reference to the accompanying drawing, of which:

Fig. 1 is a schematic elevation of the structure of a direction finder according to the present invention, Fig. 2 is a graph showing the angular relationships involved in the operation of the system, Fig. 3 is a schematic diagram of an indicator system according to the invention, and Fig. 4 is a schematic diagram of a modification of the invention.

Referring to Fig. 1, a wave collector such as a vertical dipole antenna 1 is supported at one end of a horizontal boom 3. Any desired type of collector element may be substituted for the dipole 1 although a non-directive element such as a vertical dipole or a horizontal loop is to be preferred. The boom 3 is supported at the upper end of a tower 5 and connected to a shaft 7 extending within the tower. The necessary radio receiver equipment is supported in a housing 11 adjacent the antenna 1. Power for the operation of the equipment may be provided by batteries or by means of a generator contained within the housing 11 and coupled to a shaft 13 extending along the boom 3. A counterweight 9 is provided at the other end of the boom 3. The shaft 13 is connected through a pinion 15 to a gear 17 provided at the top of the tower 5. The lower end of the shaft 7 is coupled through gearing 19 to a motor 21. The above structure is identical with that described in the aforementioned application Ser. No. 487,678, filed on May 20, 1943, by L. E. Norton. The motor 21 drives the shaft 7 at constant speed, moving the antenna 1 in a circular path. This produces phase modulation of signals picked up by the antenna, owing to the cyclical variation in the distance between the antenna and the radiation source.

Referring to Fig. 3, a phase detector system, generally designated by the reference numeral 23, of the type described is coupled to the antenna 1. A preferred arrangement is that shown in Figure 1, wherein a microwave transmitter is provided in the housing 11 and arranged to be modulated by the signal picked up by the antenna 1. The remainder of the equipment may be placed at the bottom of the tower 5 and actuated from a microwave receiver 2. The phase detector 23 comprises a local radio frequency oscillator 25, a fixed intermediate frequency oscillator 27, a balanced modulator 29 connected to the oscillators 25 and 27 and a modulator 31 connected to the output circuit of the modulator 29. A radio frequency amplifier 33 is provided in the input circuit from the antenna 1 and is coupled to the modulator 31. The tuning controls of the oscillator 25 and the amplifier 33 are mechanically ganged, as indicated by the dash line 35. The output circuit of the modulator 31 is coupled to a filter 37 which is tuned to pass voltages of intermediate frequency. The oscillator 25 is arranged to be controlled over a narrow range of frequency by means of a D.-C. control voltage. An automatic frequency control circuit 39 for this purpose is coupled to the filter 37 and hence to the oscillator 25 and through a 90° phase shifter 41 to the output circuit of the I.-F. oscillator 27.

A delay line 43 is included in the connection between the amplifier 33 and the modulator 31. The midpoint of the line 43 is connected to the input circuit of the modulator 31. The line 43 has a length such that the delay introduced by it is equal to the time required for radiation to travel over a path equal in length to the diameter of the circular path swept by the antenna 1. The line 43 is terminated in a resistor 45 equal to the characteristic impedance of the line. Four electron tubes 47, 49, 51 and 53 are connected to the line 43 and to a pair of variable voltage dividers 55 and 57. The tubes 47, 49, 51 and 53 are provided with multiple control electrodes and may be of the type RCA 6L7 or the like. The inner control grids of the tubes 47 and 53 are connected together and to the end of the line 43 nearer the amplifier 33. The inner control grids of the tubes 51 and 49 are connected together and to the end of the line 43 remote from the amplifier 33.

The outer control grids of the tubes 47 and 51 are connected together and to the voltage divider 55. The outer control grids of the tubes 49 and 53 are connected together and to a voltage divider 57. D.-C. sources 59 and 61 are connected across the voltage dividers 55 and 57, respectively. The negative terminal of the source 59 is connected to the upper end of the voltage divider 55 and the positive terminal of the source 61 is connected to the upper end of the voltage divider 57. The control shafts of the voltage dividers 55 and 57 are mechanically ganged, as indicated by the dash line 63, and coupled to a pointer 65. A circular scale 67, calibrated in terms of elevation angle, is provided for cooperation with the pointer 65.

The anodes of the tubes 47 and 49 are connected together to a common load resistor 69. The anodes of the tubes 51 and 53 are similarly connected to a load resistor 71. The resistors 69 and 71 are coupled through blocking capacitors 73 and 75, respectively, to the inner control grids of a pair of electron discharge tubes 77 and 79, similar to the tubes 47 and 49.

An alternator 81 is mechanically coupled to the shaft 7 (Fig. 1) so as to provide one cycle for each revolution of the shaft 7. The output of the generator 81 is applied to a variable 360° phase shifter 83. The output of the phase shifter 83 is applied to the outer control grids of the tubes 77 and 79. The control shaft of the phase shifter 83 is coupled to a pointer 85. A scale 87, calibrated in terms of azimuth angle, is provided for cooperation with the pointer 85. The anodes of the tubes 77 and 79 are connected together to a common load resistor 89. A cathode ray tube 91 is provided with orthogonally disposed pairs of deflection electrodes 93 and 95, respectively. The deflection electrodes 93 and 95 respectively are connected to the load resistor 89 and to the radio frequency oscillator 25.

The operation of the above described system is as follows:

The amplifier 33 and the oscillator 25 are tuned to the frequency of the desired signal. The outputs of the oscillator 25 and the oscillator 27 are combined in the balanced modulator 29 to provide a voltage differing in frequency from the carrier by substantially the I.-F. frequency. The output of the modulator 29 is combined in the modulator 31 with the output of the amplifier 33 to provide a signal of I.-F. frequency carrying the phase modulation of the incoming carrier. The filter 37 removes all components of carrier and higher frequencies from the output of the modulator 31.

Initially, the output of the oscillator 25 may not be of exactly the same frequency as the incoming carrier. In this event the output of the balanced modulator will not differ from the carrier frequency by exactly the frequency of the oscillator 27, and the output of the filter 37 will be of a frequency correspondingly differing from the I.-F. frequency. These two frequencies are compared in the A.-F.-C. circuit 39 to produce a D.-C. voltage corresponding in magnitude and polarity to their difference. The D.-C. output of the A.-F.-C. circuit 39 is applied to the control circuit of the oscillator 25, adjusting the frequency of the locally generated R.-F. voltage so that the two I.-F. voltages are equal in frequency. At this time, the frequency of operation of the oscillator 25 will be exactly equal to the carrier frequency.

The phase detector 23 provides two outputs: phase modulated R.-F. carrier voltage which is applied to the delay line 43, and unmodulated R.-F. voltage of carrier frequency which is applied to the deflection plate 95 of the cathode ray tube 91. The output of the amplifier 33 may be represented as:

$$e_0 = E_0 \sin(\omega t - 2\pi r/\lambda \cos \psi \cos(\rho t + \theta) - 2\pi r/\lambda)$$

with respect to some arbitrary reference potential $$e'_0 = E'_0 \sin \omega t$$

where $r$ is the radius of the path swept by the antenna, $\psi$ is the elevation of wave arrival, $\rho/2\pi$ is the frequency of revolution of the antenna and $\theta$ is the azimuth of wave arrival.

Referring to Fig. 2, the angular position of the antenna $\rho t$ and the azimuth angle $\theta$ are measured from a predetermined reference line A—A, such as the local meridian. The voltage at the midpoint of the line 43 is:

$$e_2 = E_2 \sin[\omega t - \phi \cos \psi \cos(\rho t + \theta)]$$

in which $\phi$ equals $2\pi r/\lambda$. The voltage applied to the inner control grids of the tube 51 is:

$$e_4 = E_4 (1 + m_4 \sin[\omega t - \phi \cos \psi \cos(\rho t + \theta) + \phi])$$

where $m_4$ is a modulation factor. The voltage applied to the outer control grid of the tube 51 is $e_c = E_c(1 + m_c)$ where $E_c$ is the terminal voltage of the source 61 and $m_c$ is a factor depending upon the position of the variable tap of the voltage divider 57. The corresponding voltages applied to the grids of the tube 53 are:

$$e'_4 = E_4 (1 + m_4 \sin[\omega t - \phi \cos \psi \cos(\rho t + \theta) - \phi])$$

and $$e'_c = E_c (1 - m_c)$$

The output of the tubes 51 and 53 across the load resistor 71 is:

$$e_5 = kE_4E_c (1 + \sin[\omega t + \tan^{-1}(\tan \phi m_c) - \phi \cos \psi \cos(\rho t + \theta)])$$

For sufficiently small values of $\phi$, as is the case in direction finders of this type, $e_5$ is approximately equal to:

$$kE_4E_c (1 + \sin[\omega t + m_c \phi - \phi \cos \psi \cos(\rho t + \theta)])$$

Since $m_c$, the control modulation factor, has a numerical value between zero and one, the phase angle may be varied between zero and plus $\phi$ by varying the voltage divider 57.

Similarly, the potentials on the grids of the tubes 47 and 49 are $e'_4$, $e_c$ and $e_4$ and $e'_c$ respectively. The output voltage from the tubes 47 and 49 across the common load resistor 69 is:

$$e'_5 = kE_4E_c (1 + \sin[\omega t - \phi \cos \psi \cos(\rho t + \theta) - \tan^{-1}(\tan \phi m_c)])$$

For sufficiently small values of $\phi$, $e'_5$ is approximately equal to:

$$kE_4E_c (1 + \sin[\omega t - \phi \cos \psi \cos(\rho t + \theta) - m_c \phi])$$

$e'_5$ can be varied through phase angles from zero to $-\phi$ as the factor $m_c$ varied from zero to one, by operation of the voltage divider 55. Thus the tubes 51 and 53 comprise a device for obtaining a phase delay between angles of zero and $+\phi$, and the tubes 47 and 49 provide the same magnitude of phase angle change between zero and $-\phi$, referred to the voltage at the midpoint of the line 43.

The output of the generator 81 is:

$$e_6 = E_6 \cos(pt+A)$$

The angle which the antenna makes with respect to the line A—A (Fig. 2) is $pt$. The mechanical connection between the generator and the shaft 7 is such as to make A—O, referred to the starting or reference line A—A. The phase shifter 83 alters the phase of the voltage generated by the generator 81 to provide an output $$e_7 = E_7 \cos(pt+B)$$

where B is the phase shift. The voltage applied to the inner control grid of the tube 79 is:

$$e_8 = E_8(1 + m_8 \sin[\omega t - \phi \cos\psi \cos(pt+\theta) + m_c\phi])$$

The voltage applied to the outer control grid of the tube 79 is:

$$e'_9 = E_9[1 + m_9 \cos(pt+B)]$$

The voltages applied to the grids of the tube 77 are:

$$e'_8 = E_8(1 + m_8 \sin[\omega t - \phi \cos\psi \cos(pt+\theta) - m_c\phi])$$

and $$e_9 = E_9[1 - m_9 \cos(pt+B)]$$

where the factors $m_8$ and then $m_9$ are determined by the D.-C. biases. The tubes 77 and 79 operate to phase modulate the received phase modulated signal at the same phase modulation frequency but in the opposite sense. The output from the tubes 77 and 79 across their common load resistor 89 is:

$$e_{10} = E_{10}(1 + m_{10} \sin[\omega t - \phi \cos\psi \, (pt+\theta) + \phi m_c \cos(pt+B)])$$

The voltage $e_{10}$ is applied to the deflection plate 93 of the cathode ray tube 91, providing corresponding horizontal deflection of the cathode ray beam. To obtain a bearing indication, the phase shifter 83 is adjusted until the pattern on the screen of the cathode ray tube maintains a constant ratio of major to minor axis. When this condition occurs, the phase shift B is equal to the angle $\theta$, and the pointer 85 indicates the azimuth on the scale 87. The voltage dividers 55 and 57 are operated to cause the pattern on the screen of the tube 91 to become a straight line. With this condition, the factor $m_c$ is equal to $\cos\psi$, and the elevation angle is indicated by the pointer 65 on the scale 67. If B is adjusted to equal $\theta$ and $m_c$ is adjusted to equal $\cos\psi$, so that $\psi = \cos^{-1} m_c$, $e'_{10}$ becomes $E_{10}(1 + m_{10} \sin\omega t$, the output of the oscillator 25 is $e_1 = E_1 \sin\omega t$, and the two voltages applied to the deflection elements of the tube 91 are of equal frequencies and are in phase, providing a line trace on the screen of the tube 91.

The operation of the system of Fig. 3 may be made entirely automatic, if desired, by means of phase responsive servo systems arranged to respond to the outputs of the phase shifter 83 and the adjustable phase delay system comprising the line 43, tubes 47, 49, 51, 53, and the voltage dividers 55 and 57. This system is designated as a whole in Figure 4 by the reference 40. Referring to Fig. 4, a phase detector 23, identical to the phase detector 24 of Fig. 3, is connected through a rectifier 101 to the outer control grids of the tubes 77 and 79. The output of the tubes 77 and 79 is applied to a phase responsive servo system 103. The servo system 103 includes a phase difference detector 107 of any conventional design and a motor 105. The motor 105 is connected through gearing 109 to the control shaft of the adjustable phase delay system 40. Output from the phase difference detector 107 operates motor 105 until the phase delay is adjusted so that the output of the phase detector $$e = E \cos(pt+\theta)$$

is in phase with the output of tubes 47, 49, 51, 53 in combination. The indicator 65 is connected to the control shaft of ganged potentiometers 55, 57, as in the system of Fig. 3. A second phase responsive servo system 111 is connected between the output of the rectifier 101 and the alternator 81 to operate a motor 113, which is mechanically coupled to the phase shifter 83.

In operation, the phase responsive servo systems 103 and 111 operate the motors 105 and 113 to drive the potentiometers 55, 57 and 83 to positions corresponding respectively to the elevation and azimuth angles of the arriving wave. The operation of the system is otherwise identical with that of the system of Fig. 3.

Thus the invention has been described as an improved direction finder system employing a revolving collector element to provide phase modulation of arriving signals and means for indicating the azimuth and elevation of wave arrival in response to said phase modulation. A local generator provides a reference voltage equal in frequency to the frequency of antenna revolution. The output of the local generator is applied through an adjustable phase shifter to a phase comparison circuit. The phase shifter is adjusted to provide phase shift in the same sense to that produced by the antenna rotation. When the two superimposed potentials are in the same phase, the phase shift angle is equal to the azimuth of wave arrival.

I claim as my invention:

1. In a radio direction finder system providing phase modulation of the carrier of an arriving wave, the method of determining the azimuth of arrival of said wave, comprising the steps of locally generating an unmodulated voltage having a frequency equal to the frequency of said carrier, locally generating a second voltage having a frequency equal to the frequency of said phase modulation of said carrier, further modulating said phase modulated carrier with said second locally generated voltage, adjusting the phases of said carrier and of said second locally generated voltage so that the superimposed phase modulations of said carrier are opposite, and measuring the magnitudes of said phase adjustments.

2. In a radio direction finder system providing phase modulation of the carrier of an arriving wave, the method of determining the azimuth of arrival of said wave, comprising the steps of locally generating an unmodulated voltage having a frequency equal to the frequency of said carrier, locally generating a second voltage having a frequency equal to that of said phase modulation, further phase modulating said modulated carrier with said second locally generated voltage, adjusting the phase of said second locally generated voltage so that the superimposed phase modulations of said carrier are opposite, and measuring the magnitude of said phase adjustment from a predetermined reference phase.

3. A radio direction finder system including a revoluble wave collector, means for revolving said wave collector in a closed path about a predetermined point whereby a signal derived by said collector from an arriving wave is phase modulated at a frequency equal to the frequency of revolution of said collector and in a phase bearing a predetermined relationship to the azimuth of arrival of said wave, means for locally generating an unmodulated voltage equal in frequency to the carrier of said signal, means for locally generating a second voltage equal in frequency to said frequency of revolution, means for adjusting the phase of said second locally generated voltage, means for adjusting the phase of said modulated signal, modulator means connected to superimpose on said carrier a second phase modulation corresponding to said second locally generated voltage, and means for comparing the output of said modulator means with said first locally generated voltage.

4. The invention as set forth in claim 3 wherein the said means for adjusting the phase of said modulated signal comprises a transmission line of predetermined length, means for applying said modulated signal to one end of said line, a terminating resistance at the other end of said line, two pairs of electron discharge tubes each comprising at least an anode, a cathode, a signal grid and a gain control grid, connections from one end of said line to the signal grids of one tube of each of said pairs, connections from the other end of said line to the signal grids of the other tubes of each of said pairs, means for applying variable bias voltages to said gain control grids and varying said bias on the tubes of each pair, and connections from the anodes of each pair of tubes to common load resistors.

LOWELL E. NORTON.